(12) United States Patent
Stepp et al.

(10) Patent No.: US 11,288,572 B2
(45) Date of Patent: Mar. 29, 2022

(54) PROGRAMMING MODEL FOR A BAYESIAN NEUROMORPHIC COMPILER

(71) Applicant: HRL Laboratories, LLC, Malibu, CA (US)

(72) Inventors: Nigel D. Stepp, Santa Monica, CA (US); Aruna Jammalamadaka, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 534 days.

(21) Appl. No.: 16/294,886

(22) Filed: Mar. 6, 2019

(65) Prior Publication Data

US 2019/0318235 A1 Oct. 17, 2019

Related U.S. Application Data

(60) Provisional application No. 62/659,085, filed on Apr. 17, 2018, provisional application No. 62/659,094, filed on Apr. 17, 2018.

(51) Int. Cl.
*G06N 3/063* (2006.01)
*G06N 3/04* (2006.01)
*G06N 3/08* (2006.01)

(52) U.S. Cl.
CPC ........... *G06N 3/0635* (2013.01); *G06N 3/049* (2013.01); *G06N 3/0472* (2013.01); *G06N 3/08* (2013.01)

(58) Field of Classification Search
CPC .................................................. G06N 3/0472
USPC .......................................................... 706/25
See application file for complete search history.

(56) References Cited

U.S. PATENT DOCUMENTS

| | | | |
|---|---|---|---|
| 9,189,730 B1* | 11/2015 | Coenen | G06N 3/049 |
| 9,886,663 B2 | 2/2018 | Sarah et al. | |
| 2010/0179935 A1* | 7/2010 | Srinivasa | G06N 3/049 706/21 |
| 2015/0074026 A1 | 3/2015 | Szatmary et al. | |
| 2015/0242745 A1* | 8/2015 | Wang | G06N 3/049 706/25 |
| 2018/0284735 A1* | 10/2018 | Cella | G05B 23/0229 |

(Continued)

OTHER PUBLICATIONS

K. Ahmed, A. Shrestha and Qinru Qiu, "Simulation of bayesian learning and inference on distributed stochastic spiking neural networks," 2016 International Joint Conference on Neural Networks (IJCNN), 2016, pp. 1044-1051, doi: 10.1109/IJCNN.2016.7727313. (Year: 2016).*

(Continued)

*Primary Examiner* — James D. Rutten
(74) *Attorney, Agent, or Firm* — Tope-McKay & Associates

(57) ABSTRACT

Described is a system for performing probabilistic computations on mobile platform sensor data. The system translates a Bayesian model representing input mobile platform sensor data to a spiking neuronal network unit that implements the Bayesian model. Using the spiking neuronal network unit, conditional probabilities are computed for the input mobile platform sensor data, where the input mobile platform sensor data is a time series of mobile platform error codes encoded as neuronal spikes. The neuronal spikes are decoded and represent a mobile platform failure mode. The system causes the mobile platform to initiate a mitigation action based on the mobile platform failure mode.

12 Claims, 7 Drawing Sheets

(56) References Cited

U.S. PATENT DOCUMENTS

2018/0284785 A1* 10/2018 Berntorp .............. G08G 1/0112
2018/0365089 A1* 12/2018 Okanohara ............. G06F 11/07

OTHER PUBLICATIONS

Notification of Transmittal of International Search Report and the Written Opinion of the International Searching Authority for PCT/US2019/021056; dated Jun. 21, 2019.
International Search Report of the International Searching Authority for PCT/US2019/021056; dated Jun. 21, 2019.
Written Opinion of the International Searching Authority for PCT/US2019/021056; dated Jun. 21, 2019.
Qiuwen Chen et al., 'Real-time anomaly detection for streaming data using burst code on a neurosynaptic processor', Design, Automation & Test in Europe Conference & Exhibition, 2017.
Amirhossein Tavanaei et al., 'Training a Hidden Markov Model with a Bayesian Spiking Neural Network', Journal of Signal Processing Systems, vol. 90, Issue 2, pp. 211-220, Feb. 2018.
Notification of and the International Preliminary Report on Patentability Chapter II for PCT/US2019/021056; dated Nov. 19, 2020.
J. Bill, L. Buesing, S. Habenschuss, B. Nessler, W. Maass, and R. Legenstein. Distributed bayesian computation and self-organized learning in sheets of spiking neurons with local lateral inhibition. PloS one, 10(8):e0134356, 2015, pp. 1-51.
Song et al., "Competitive Hebbian Learning through Spike-Timing-Dependent Synaptic Plasticity" in Nature Neuroscience 3, pp. 919-926.

\* cited by examiner

PROGRAMMING MODEL FOR A BAYESIAN NEUROMORPHIC COMPILER

CROSS-REFERENCE TO RELATED APPLICATIONS

This is a Non-Provisional Applications of U.S. Provisional Application No. 62/659,085, filed in the United States on Apr. 17, 2018, entitled, "A Neuronal Network Topology for Computing Conditional Probabilities," the entirety of which is incorporated herein by reference.

This is ALSO a Non-Provisional Applications of U.S. Provisional Application No. 62/659,094, filed in the United States on Apr. 17, 2018, entitled, "Programming model for a Bayesian Neuromorphic Compiler," the entirety of which is incorporated herein by reference.

BACKGROUND OF INVENTION

(1) Field of Invention

The present invention relates to a system for performing probabilistic computations and, more particularly, to a system for performing probabilistic computations using neuronal spikes in a spiking neuronal network unit.

(2) Description of Related Art

A Bayesian network is a probabilistic graphical model that represents a set of variables and their conditional dependencies via a directed acyclic graph (DAG). As described by Bill et al. in "Distributed Bayesian Computation and Self-Organized Learning in Sheets of Spiking Neurons with Local Lateral Inhibition" in PLoS one, 10(8), 2015 (hereinafter referred to as the Bill reference), Bayesian probability theory has emerged as a framework for describing perception, reasoning, and learning of mammals. However, the understanding of how probabilistic computations could be organized is not well understood.

There are existing systems that create a high-level language for specifying Bayesian models, but they target conventional computing hardware, such as a general purpose central processing units (CPU) or graphics processing units (GPU). A group at Graz University is working on theoretical mappings between Bayesian inference algorithms and neuronal dynamics, however even their most recent work (the Bill reference) requires careful manual specification of the neuronal network structure, which then only applies to very specific datasets or use-cases. The Bill reference is only mathematical theory at this point, and would require manufacturing of an entirely new hardware design to move to higher technical readiness levels.

Thus, a continuing need exists for a programming model that automatically translates Bayesian network models into neuromorphic computing models for enabling users who are not familiar with neuronal properties to leverage neuronal computations.

SUMMARY OF INVENTION

The present invention relates to a system for performing probabilistic computations and, more particularly, to a system for performing probabilistic computations using neuronal spikes in a spiking neuronal network unit. The system comprises one or more processors and a non-transitory computer-readable medium having executable instructions encoded thereon such that when executed, the one or more processors perform multiple operations. The system translates a Bayesian model representing input mobile platform sensor data to a spiking neuronal network unit that implements the Bayesian model. Using the spiking neuronal network unit, conditional probabilities are computed for the input mobile platform sensor data, wherein the input mobile platform sensor data is a time series of mobile platform error codes encoded as neuronal spikes. The neuronal spikes are decoded, wherein the decoded neuronal spikes represent at least one mobile platform failure mode. The system causes the mobile platform to initiate a mitigation action based on the at least one mobile platform failure mode.

In another aspect, the Bayesian model represents mobile platform error codes, mobile platform failure modes, and connections between the mobile platform error codes and the mobile platform.

In another aspect, the spiking neuronal network unit comprises a plurality of neurons A, B, C, D, and E having the following dynamics: a tonic input causes neuron A to spike, and neuron A causes neuron B to spike, resulting in an increase to a synaptic weight w, neuron B causes neuron C to spike twice, once through neuron D and once through neuron E, and if neuron C spikes, then a delay $\tau_1$ will cause neuron B to spike before neuron A, resulting in a decrease to the synaptic weight w, wherein the synaptic weight w decreases in proportion to itself.

In another aspect, in order to compute a conditional probability of two input processes X and Y, inputs to a phasic input and the tonic input of the spiking neuronal network unit are defined, wherein the phasic input comes from a logical conjunction of the two input processes X and Y, and the tonic input comes from the input process X, wherein the tonic input corresponds to P(X), and the phasic input corresponds to P(X,Y), resulting in the synaptic weight w converging to P(X,Y)/P(X)=P(Y|X), where P denotes probability, / denotes division, and | denotes a conditional relationship.

In another aspect, for the purposes of building up higher-order computations, the spiking neuronal network unit is decomposable into a convergence unit CON, which causes the synaptic weight w to exponentially decay to a value, and a multiplier unit M, which acts as a logical conjunction, wherein the convergence unit CON and the multiplier unit M correspond to functions CON: X×Y→Z and M:X×Y→Z, respectively, where Z represents the output of each function, × denotes a pairing of input arguments, and → denotes mapping from input to output.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
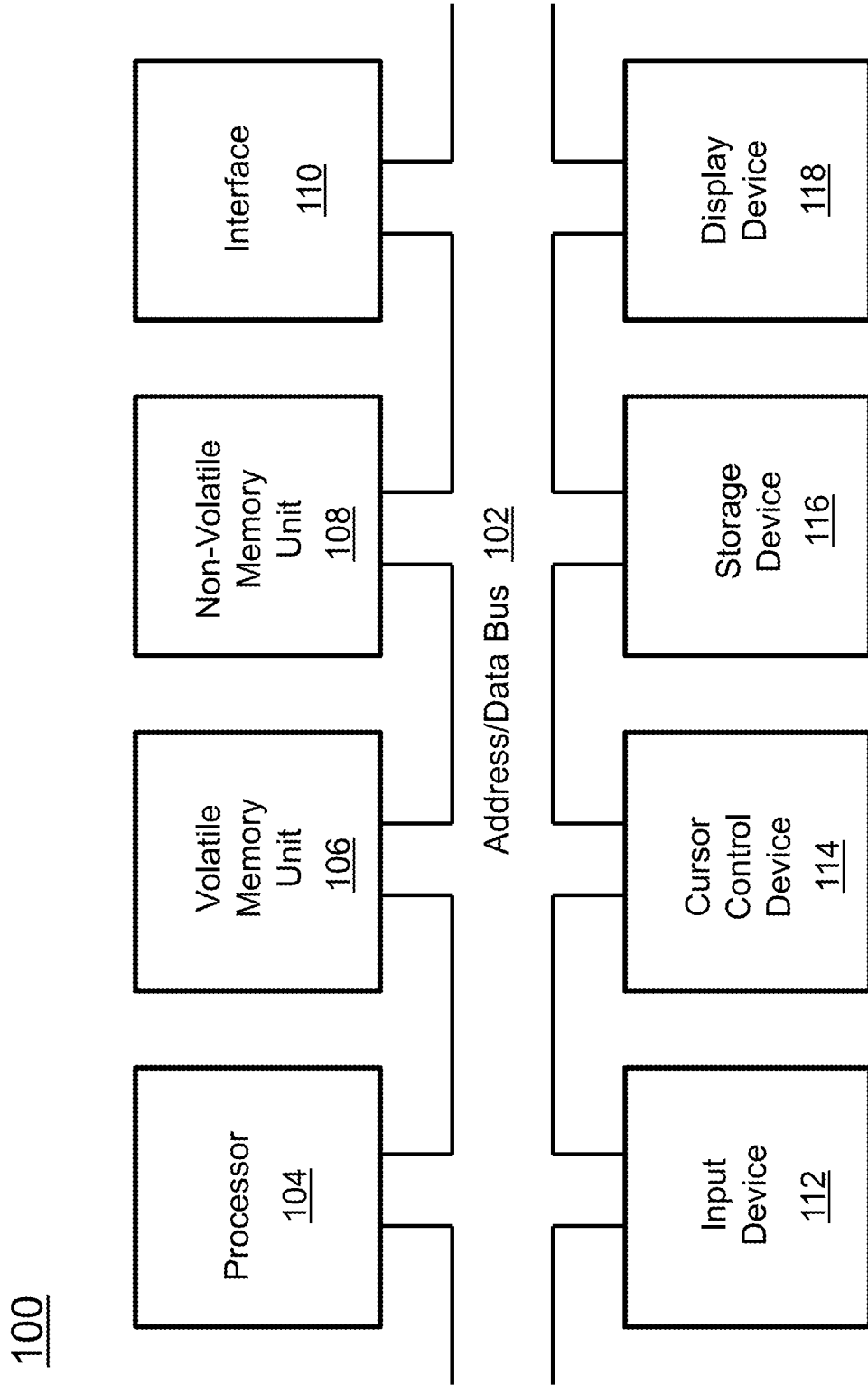
FIG. 1 is a block diagram depicting the components of a system for performing probabilistic computations according to some embodiments of the present disclosure.

The present invention relates to a system for performing probabilistic computations and, more particularly, to a system for performing probabilistic computations using neuronal spikes in a spiking neuronal network unit. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for performing probabilistic computations. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
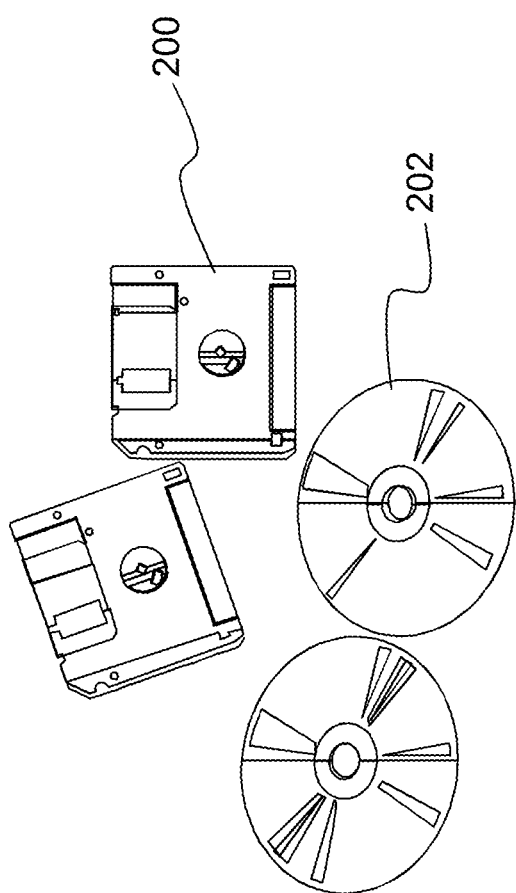
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

Described is a Bayesian Neuromorphic Compiler (BNC) that takes as input a Bayesian network model, or particular computation thereon, and produces a spiking neuronal network topology and configuration that implements that model or computation. The system according to embodiments of the present disclosure utilizes a unique spiking neuronal network unit that performs probabilistic computations using neuronal spikes. An interface is provided for a user who is skilled in Bayesian models, but not skilled in neuromorphic computing, to utilize this spiking computation system. In one embodiment, the interface is a text file that the user writes that is then input to the neuromorphic compiler.

The invention described herein enables an end-user who is skilled in the art of constructing Bayesian network models to take advantage of particular spiking neuronal networks that perform Bayesian computations. There are existing systems that create a high-level language for specifying Bayesian models, but they target conventional computing hardware, such as a general purpose central processing unit (CPU) or graphics processing unit (GPU). By targeting a special purpose spiking neuronal network, the user of the invention described herein can compute more efficiently and at a larger scale, which is an improvement over existing systems. The system described herein allows the user to do so without knowledge of the details of that neuronal network.

This invention includes a software package designed to accept a high-level description of a Bayesian model or specific probabilistic computation (e.g., the model X→Y→Z or the computation P(Z|Y)P(Y|X), and generate a neuronal network topology and configuration that implements the model or computation. The method exploits the conditional probabilistic functional unit (element 301) shown in FIG. 3, which is described in detail in U.S. Provisional Application No. 62/659,085, entitled, "A Neuronal Network Topology for Computing Conditional Probabilities," which is hereby incorporated by reference as though fully set forth herein.

Figure 3:
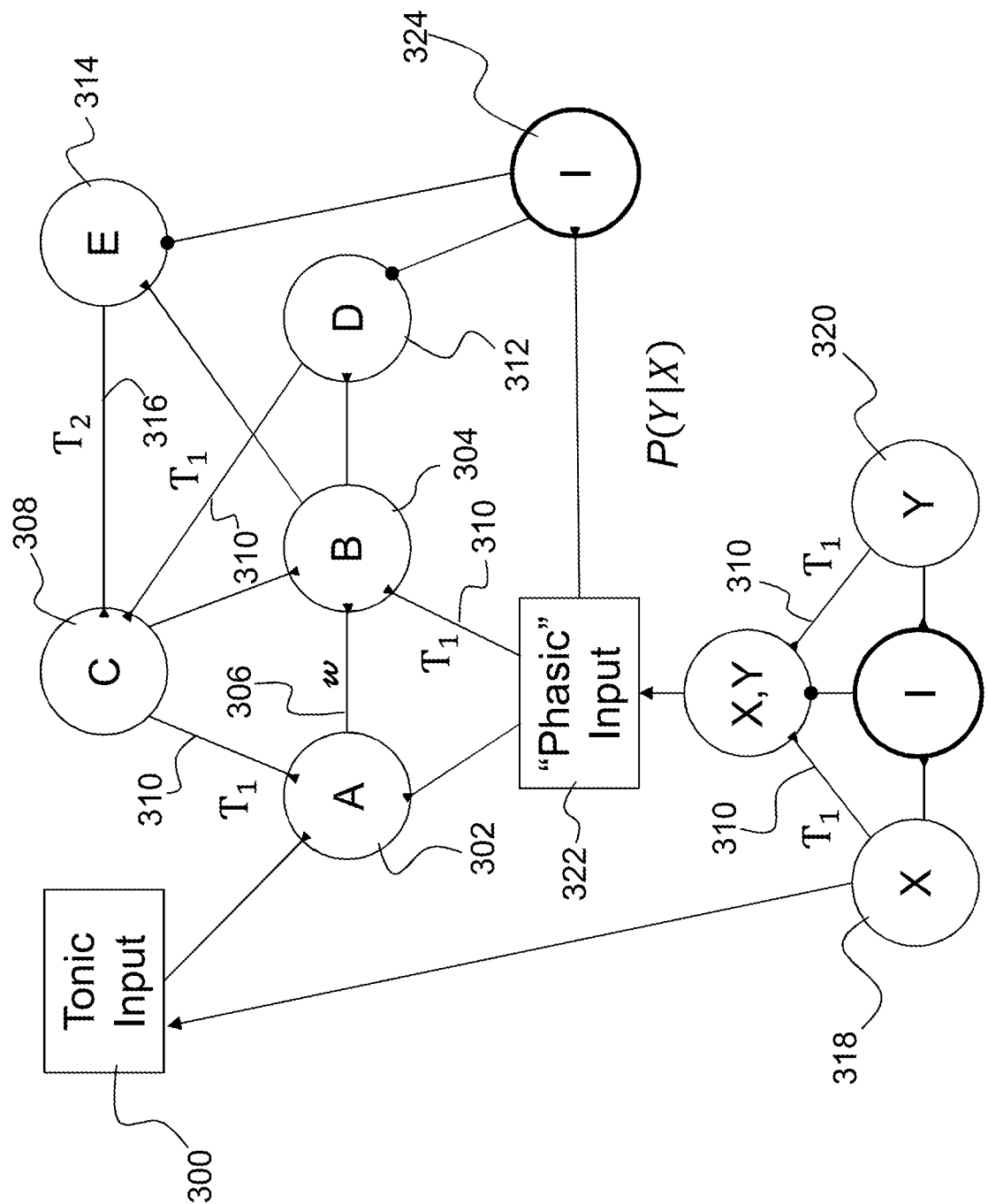
FIG. 3 is an illustration of a probabilistic computation unit which takes two input processes X and Y according to some embodiments of the present disclosure.

FIG. 3 depicts a five-neuron network with the following dynamics for a synaptic weight w. The "Tonic" input (element 300) causes neuron A (element 302) to spike, A (element 302) causes neuron B (element 304) to spike, resulting in an increase to w (element 306). However, if neuron C (element 308) spikes, delay $\tau_1$ (element 310) will cause B (element 304) to spike before A (element 302), causing w (element 306) to decrease. Additionally, A (element 302) will not cause B (element 304) to spike after $\tau_1$ (element 310) due to B's (element 304) refractory period. This results in maintenance of a balance, dependent on C (element 308) (i.e., if C (element 308) spikes every time B (element 304) spikes). Neurons D (element 312) and E (element 314) were added, with input from B (element 304) and delays $\tau_1$ (element 310) and $\tau_2$ (element 316), respectively. Since $\tau_1$ (element 310)<$\tau_2$ (element 316), B (element 304) will cause C (element 308) to spike twice: once through D (element 312) (fast path) and once through E (element 314) (slow path). Thus, for each spike from the tonic input (element 300) that causes w (element 306) to increase, there are two spikes coming from C (element 308) that cause it to decrease. As a result w (element 306) decreases in proportion to itself.

In order to compute the conditional probability of two input processes X (element 318) and Y (element 320), define inputs to a phasic input (element 322) and the tonic input (element 300). The additional neuron I (element 324) inhibits neurons D (element 312) and E (element 314) so that they will not spike with the phasic input (element 322), and there will be no associated decrease in w (element 306). The phasic input (element 322) comes from the logical AND of the two input processes X (element 318) and Y (element 320), and the tonic input (element 320) comes straight from X (element 318). Since the tonic input (element 320) corresponds to P(X) and the phasic input (element 322) corresponds to P(X,Y), this equation forces w to converge to P(X,Y)/P(X)=P(Y|X).

(3.1) Composing the Functional Unit

Figure 4A:
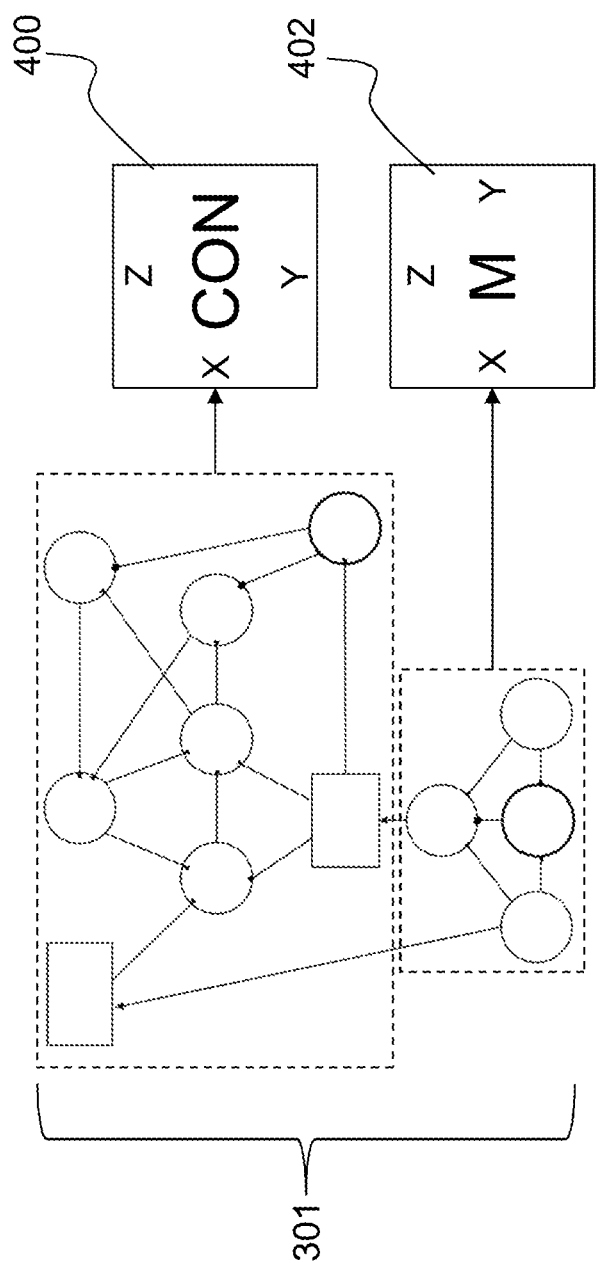
FIG. 4A is an illustration of the probabilistic computation unit decomposed into a convergence unit and a multiplier unit according to some embodiments of the present disclosure.
Figure 4B:
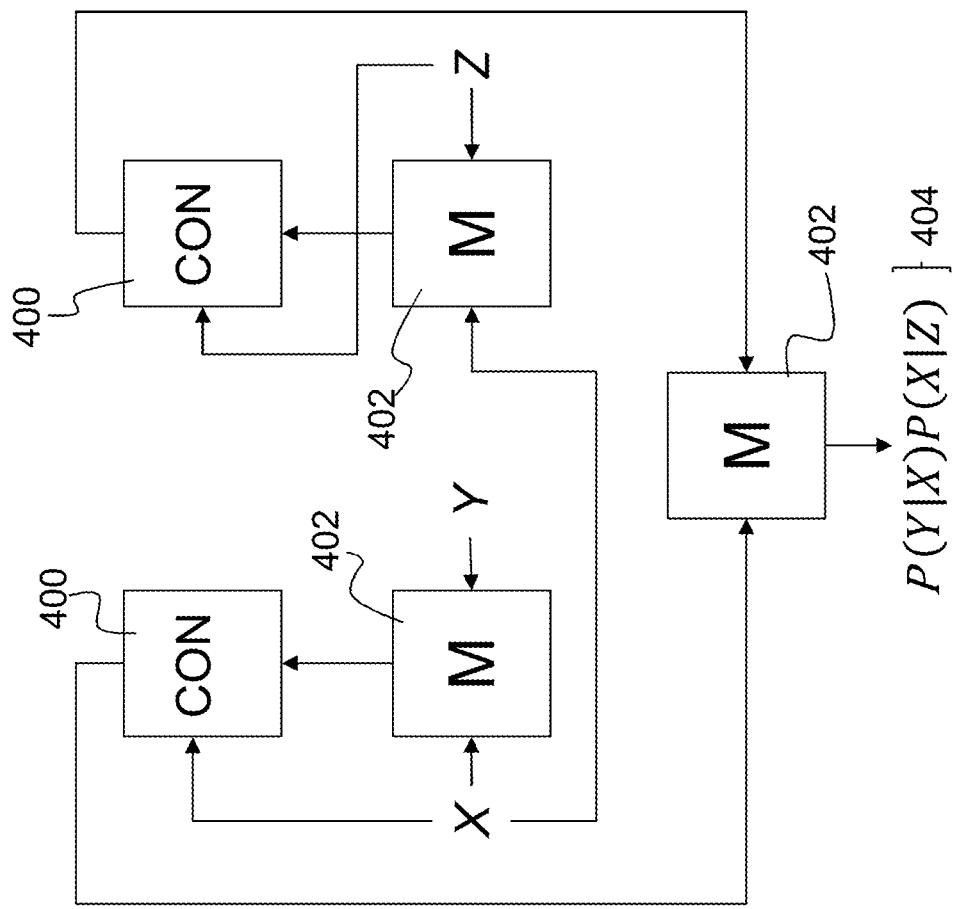
FIG. 4B is an illustration of the convergence unit and the multiplier unit re-composed according to some embodiments of the present disclosure.

The conditional probabilistic functional unit (element 301) in FIG. 3 may be decomposed further into a "Convergence Unit", CON (element 400), which causes the weight w (element 306) to exponentially decay to a value, and a "Multiplier Unit", M (element 402), which acts as a logical AND, as shown in FIG. 4A. These units correspond to functions CON: X×Y→Z and M X×Y→Z. To build a higher level computation, these components may be re-composed, as shown in FIG. 4B. In that example, CON (element 400) and M (element 402) are composed to form the computation P(Y|X)P(X|Z) (element 404).

The BNC takes a model or computation and produces the composition described above. There are two modes of compilation, conditional model specification (e.g., for structure learning) and computation implementation (e.g., for performing a readout of a particular probability; see section (3.1.2)).

(3.1.1) Conditional Model Specification

Figure 5:
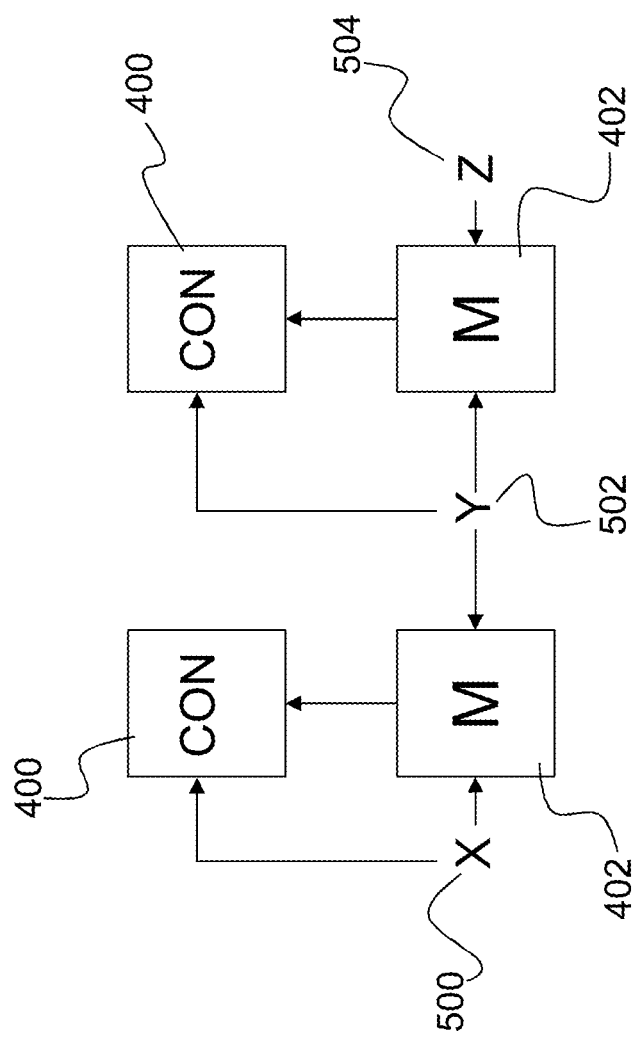
FIG. 5 is an illustration of an example model specification by composition of CON-M units according to some embodiments of the present disclosure.

Using the example model A→B→C, the BNC produces a network topology that encodes the model by replacing each arrow of the model with a neuronal network. Each arrow in the model corresponds to a single CON-M unit. The X and Y inputs of M correspond to the source and destination of the arrow, respectively. The X and Y inputs of CON come from the arrow source and the output of M. For instance, if X is "the grass is wet" and Y is "it is raining", the arrow from X to Y models the probability that it is raining, given that the grass is wet. For the example model, the resulting composition is shown in FIG. 5. In this mode, applying inputs for X (element 500), Y (element 502), and Z (element 504) will cause the networks to learn P(B|A) and P(C|B).

(3.1.2) Specific Computation

Using the same model, X→Y→Z, there may be an interest in a specific computation. In this context, computations typically take the form of chaining two or more conditionals, such as P(Z|Y)P(Y|X). If each conditional in this computation corresponds to an arrow of the model, which is typically the case, then the computation is implemented by taking the output of the CON-M units (elements 400 and 402) defined by each arrow and combining them with individual M units. This type of computation is shown in FIG. 4B.

(3.2) Overall Programming Model

Provided with the above mappings, a programming model can be specified that enables a high-level programming language to implement the appropriate compositions. As above, this follows along two paths, model specification and computation.

(3.2.1) Model Specification

A model is made up of arrows, as defined by the following syntax.

```
⟨model⟩ ::= '{'⟨arrow_list⟩'}'
⟨arrow_list⟩ ::=⟨arrow⟩[',' ⟨arrow_list⟩]
|⟨empty⟩
⟨arrow⟩ ::=⟨var⟩ '->'⟨var⟩
```

Using this example grammar, composition goes by,

```
Net ← ∅
for arrow(x,y) in model do
        A ← lookup(Net, x)
                if A = ∅ then
                A ← NewVar( )
                end if
        B ← lookup(Net, y)
                if B = ∅ then
                B ← NewVar( )
                end if
        Net ← Net + C(A, M(A, B))
                end for
```

(3.2.2) Specific Computation

Computations are defined as a list of conditionals, which amounts to a product of conditionals. It is possible for other types of computations to be introduced, though by the nature of probabilities, they will be of similar form.

```
⟨computation⟩ ::=⟨conditional_list⟩
⟨computation⟩ ::=⟨conditional⟩⟨conditional_list⟩
|⟨empty⟩
⟨conditional⟩ ::=⟨var⟩ '|'⟨var⟩
```

Using this example grammar, composition goes by,
Net←∅
Last←∅
for conditional (x,y) in computation do

```
            A ← lookup(Net, x)
                if A = ∅ then
                A ← NewVar( )
                end if
            B ← lookup(Net, y)
                if B = ∅ then
                B ← NewVar( )
                end if
            This ← C(B, M(A, B))
                if Last = ∅ then
                Last ← M(Last, This)
            else
                        Last ← This
            end if
            end for
```

(3.3) Experimental Studies

Figure 6:
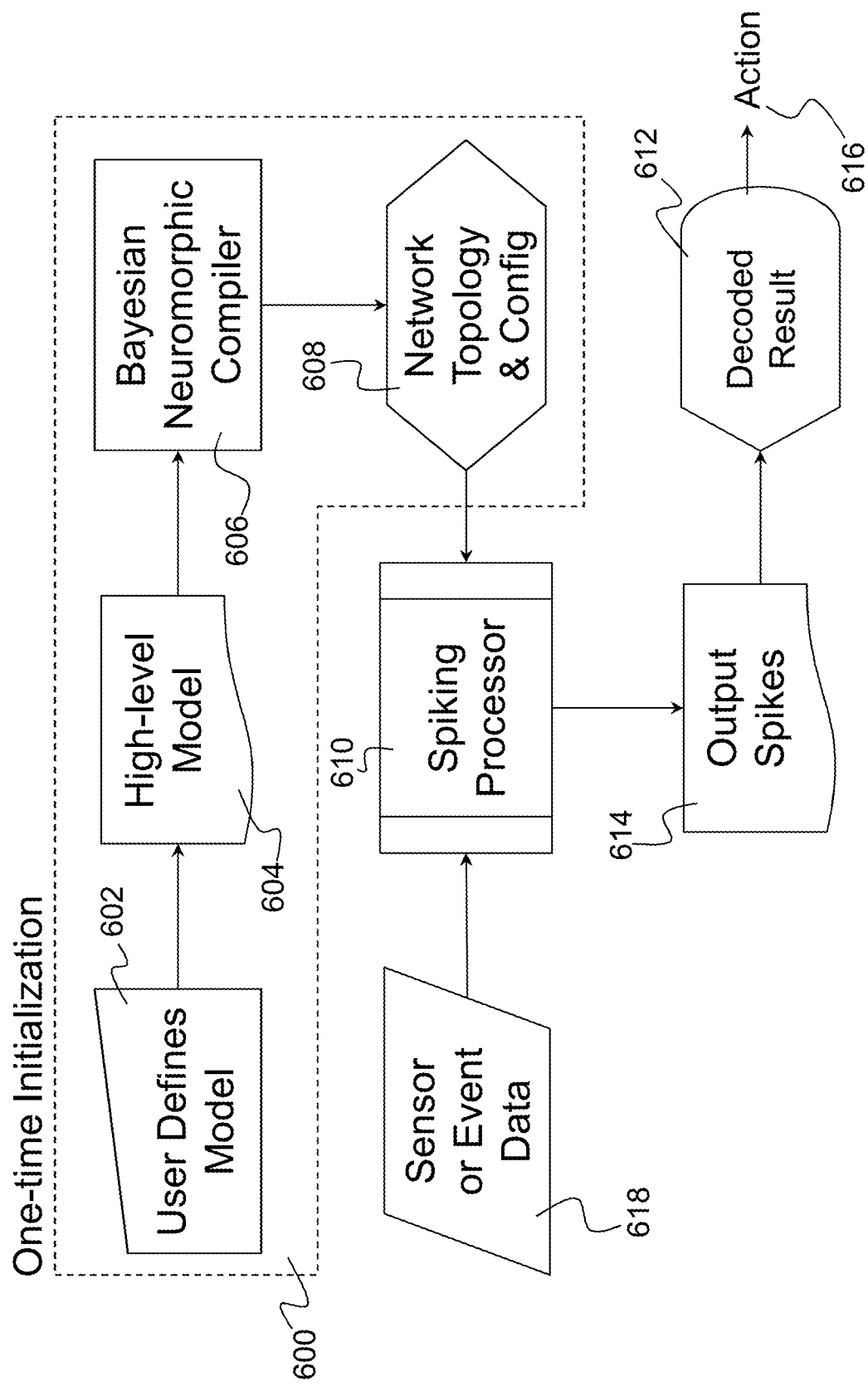
FIG. 6 is a flow diagram illustrating a system for performing probabilistic computation using neuronal spikes according to some embodiments of the present disclosure.

FIG. 6 is a flow diagram of the concept of operations for the end-user. As described above, during a one-time initialization (element 600), the user defines a Bayesian model once (element 602), and the Bayesian Neuromorphic Compiler (element 606) accepts the Bayesian model (element 604) and translates it into a neuronal network topology and configuration (element 608) composed of neuron placement, routing instructions, and parameter settings. Neuron placement includes specifying the physical location of virtual neurons on a piece of neuromorphic hardware. Routing instructions include specification of routing switch states such that neurons are appropriately connected. Parameter settings refer to the values of various settable parameters that control the execution of the neuromorphic system, such as delays, time constants, and thresholds. The details of each of these will depend on the specific neuromorphic hardware in use.

The Spiking Processor (element 610) accepts sensor or event data (element 618) from a mobile platform having at least one sensor (e.g., vehicle, robot, autonomous platform) as input and uses the neuronal network topology and configuration (element 608) to make probabilistic inferences, decode results (element 612) from neuronal spikes (element 614), and send those results back to the user or to a mobile platform (e.g., vehicle) component for action (element 616) selection. The flow is meant to allow the user or processor in the vehicle to harness the power of neuromorphic computation without any added complexity. This makes the system generally applicable in any scenario where Bayesian networks are used.

The invention applies to any program that requires learning of or computing over Bayesian models. Non-limiting examples include autonomous driving and fault diagnostics. For instance, in a fault diagnostic application and referring to FIG. 6, the Bayesian model (element 604) can contain certain error codes and failure modes with connections between them. The sensor or event data (element 618) can be a time series of error codes, such as a sensor being out of range or subsystem failure, encoded as neuronal spikes (one input neuron per error code type and one spike per error code occurrence). In this example, the decoded output (element 612) would contain a representation of failure modes, such as part malfunction or environmental anomaly, given the error codes. High probability failure modes could then trigger fault mitigation actions (element 616) to cause the vehicle to initiate a mitigation action, such as a shutdown procedure, etc. As a non-limiting example, the vehicle (or robot) may be caused to safely navigate to a stop and then turn off the vehicle systems.

In one embodiment, the mitigation action (element 616) is automatic generation of a visual alert which is sent to a display viewed by a user (e.g., smartphone screen, tablet screen, computer monitor, laptop screen). The alert can provide specific instructions to the user of how to address the failure mode, such as the need to add air to a tire or to make an appointment with a mechanic for a repair or maintenance. In another embodiment, the mitigation action is a vehicle operation that takes the vehicle to a target location. For instance, if the battery in the vehicle needs to be recharged, one or more processors in the vehicle can request location information for the nearest charging station, and navigate the vehicle to the charging station. In yet another embodiment, the mitigation action is an automatic appointment reservation made by one or more processors in the vehicle to resolve the failure mode. By targeting efficient and scalable neuronal systems, the invention has particular benefits for mobile, unattended, and power-constrained platforms. By targeting a special purpose spiking neuronal network, the user may compute more efficiently and at a larger scale. The system described herein allows the user to do so without knowledge of the details of that neuronal network.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for performing probabilistic computations on mobile platform sensor data, the system comprising:
one or more processors and a non-transitory computer-readable medium having executable instructions encoded thereon such that when executed, the one or more processors perform operations of:
translating a Bayesian model representing input mobile platform sensor data to a spiking neuronal network unit that implements the Bayesian model;
using the spiking neuronal network unit, computing conditional probabilities for the input mobile platform sensor data, wherein the input mobile platform sensor data is a time series of mobile platform error codes encoded as neuronal spikes,
wherein the spiking neuronal network unit comprises a plurality of neurons A, B, C, D, and E having the following dynamics:
a tonic input causes neuron A to spike, and neuron A causes neuron B to spike, resulting in an increase to a synaptic weight w,
neuron B causes neuron C to spike twice, once through neuron D and once through neuron E, and
when neuron C spikes, then a delay $\tau_1$ will cause neuron B to spike before neuron A, resulting in a decrease to the synaptic weight w, wherein the synaptic weight w decreases in proportion to itself;
decoding the neuronal spikes, wherein the decoded neuronal spikes represent at least one mobile platform failure mode; and
causing the mobile platform to initiate a mitigation action based on the at least one mobile platform failure mode.

2. The system as set forth in claim 1, wherein the Bayesian model represents mobile platform error codes, mobile platform failure modes, and connections between the mobile platform error codes and the mobile platform.

3. The system as set forth in claim 1, wherein in order to compute a conditional probability of two input processes X and Y, inputs to a phasic input and the tonic input of the spiking neuronal network unit are defined, wherein the phasic input comes from a logical conjunction of the two input processes X and Y, and the tonic input comes from the input process X, wherein the tonic input corresponds to P(X), and the phasic input corresponds to P(X,Y), resulting in the synaptic weight w converging to P(X,Y)/P(X)=P(Y|X), where P denotes probability, / denotes division, and | denotes a conditional relationship.

4. The system as set forth in claim 1, wherein the spiking neuronal network unit is decomposable into a convergence unit CON, which causes the synaptic weight w to exponentially decay to a value, and a multiplier unit M, which acts as a logical conjunction, wherein the convergence unit CON and the multiplier unit M correspond to functions CON: X×Y→Z and M:X×Y→Z, respectively, where Z represents the function output, × denotes paired input arguments, and → denotes mapping from input to output.

5. A computer implemented method for performing probabilistic computations on mobile platform sensor data, the method comprising acts of:
causing one or more processors to execute instructions encoded on a non-transitory computer-readable medium, such that upon execution, the one or more processors perform operations of:
translating a Bayesian model representing input mobile platform sensor data to a spiking neuronal network unit that implements the Bayesian model;
using the spiking neuronal network unit, computing conditional probabilities for the input mobile platform sensor data, wherein the input mobile platform sensor data is a time series of vehicle error codes encoded as neuronal spikes,
wherein the spiking neuronal network unit comprises a plurality of neurons A, B, C, D, and E having the following dynamics:
a tonic input causes neuron A to spike, and neuron A causes neuron B to spike, resulting in an increase to a synaptic weight w,
neuron B causes neuron C to spike twice, once through neuron D and once through neuron E, and
when neuron C spikes, then a delay $\tau_1$ will cause neuron B to spike before neuron A, resulting in a decrease to the synaptic weight w, wherein the synaptic weight w decreases in proportion to itself;
decoding the neuronal spikes, wherein the decoded neuronal spikes represent at least one mobile platform failure mode; and
causing the mobile platform to initiate a mitigation action based on the at least one mobile platform failure mode.

6. The method as set forth in claim 5, wherein the Bayesian model represents mobile platform error codes, mobile platform failure modes, and connections between the mobile platform error codes and the mobile platform.

7. The method as set forth in claim 5, wherein in order to compute a conditional probability of two input processes X and Y, inputs to a phasic input and the tonic input of the spiking neuronal network unit are defined, wherein the phasic input comes from a logical conjunction of the two input processes X and Y, and the tonic input comes from the input process X, wherein the tonic input corresponds to P(X), and the phasic input corresponds to P(X,Y), resulting in the synaptic weight w converging to P(X,Y)/P(X)=P(Y|X), where P denotes probability, / denotes division, and | denotes a conditional relationship.

8. The method as set forth in claim 5, wherein the spiking neuronal network unit is decomposable into a convergence unit CON, which causes the synaptic weight w to exponentially decay to a value, and a multiplier unit M, which acts as a logical conjunction, wherein the convergence unit CON and the multiplier unit M correspond to functions CON: X×Y→Z and M:X×Y→Z, respectively, where Z represents the function output, × denotes paired input arguments, and → denotes mapping from input to output.

9. A computer program product for performing probabilistic computations on mobile platform sensor data, the computer program product comprising:
computer-readable instructions stored on a non-transitory computer-readable medium that are executable by a computer having one or more processors for causing the processor to perform operations of:
translating a Bayesian model representing input mobile platform sensor data to a spiking neuronal network unit that implements the Bayesian model;
using the spiking neuronal network unit, computing conditional probabilities for the input mobile platform sensor data, wherein the input mobile platform sensor data is a time series of mobile platform error codes encoded as neuronal spikes,
wherein the spiking neuronal network unit comprises a plurality of neurons A, B, C, D, and E having the following dynamics:
a tonic input causes neuron A to spike, and neuron A causes neuron B to spike, resulting in an increase to a synaptic weight w,
neuron B causes neuron C to spike twice, once through neuron D and once through neuron E, and
when neuron C spikes, then a delay $\tau_1$ will cause neuron B to spike before neuron A, resulting in a decrease to the synaptic weight w, wherein the synaptic weight w decreases in proportion to itself;
decoding the neuronal spikes, wherein the decoded neuronal spikes represent at least one mobile platform failure mode; and
causing the mobile platform to initiate a mitigation action based on the at least one mobile platform failure mode.

10. The computer program product as set forth in claim 9, wherein the Bayesian model represents mobile platform error codes, mobile platform failure modes, and connections between the mobile platform error codes and the mobile platform.

11. The computer program product as set forth in claim 9, wherein in order to compute a conditional probability of two input processes X and Y, inputs to a phasic input and the tonic input of the spiking neuronal network unit are defined, wherein the phasic input comes from a logical conjunction of the two input processes X and Y, and the tonic input comes from the input process X, wherein the tonic input corresponds to P(X), and the phasic input corresponds to P(X,Y), resulting in the synaptic weight w converging to P(X,Y)/P(X)=P(Y|X), where P denotes probability, / denotes division, and | denotes a conditional relationship.

12. The computer program product as set forth in claim 9, wherein the spiking neuronal network unit is decomposable into a convergence unit CON, which causes the synaptic weight w to exponentially decay to a value, and a multiplier unit M, which acts as a logical conjunction, wherein the convergence unit CON and the multiplier unit M correspond to functions CON: X×Y→Z and M:X×Y→Z, respectively, where Z represents the function output, × denotes paired input arguments, and → denotes mapping from input to output.

* * * * *